United States Patent
Rao et al.

(10) Patent No.: US 6,317,640 B1
(45) Date of Patent: Nov. 13, 2001

(54) SYSTEM AND METHOD FOR NON-PARAMETRIC MODELING OF PROCESSED INDUCED VARIABILITY

(75) Inventors: Suraj Rao, Dallas; Sharad Saxena, Richardson; Pushkar P. Apte, Dallas; Purnendu K. Mozumder, Plano; Richard Gene Burch, McKinney; Karthik Vasanth, Dallas; Joseph Carl Davis, Allen, all of TX (US); Chenjing L. Fernando, Willoughby, OH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/225,877

(22) Filed: Jan. 5, 1999

Related U.S. Application Data

(60) Provisional application No. 60/070,551, filed on Jan. 6, 1998.

(51) Int. Cl.$^7$ .................................................. G06F 19/00
(52) U.S. Cl. ............................... 700/98; 700/44; 700/121
(58) Field of Search ................................. 700/121, 110, 700/109, 107, 95, 97, 30, 29, 31, 28, 44, 45, 40; 702/8, 4, 181, 85; 716/8, 9.21, 16

(56) References Cited

U.S. PATENT DOCUMENTS

| | | | |
|---|---|---|---|
| 5,301,118 | * | 4/1994 | Heck et al. .............................. 716/8 |
| 5,646,870 | * | 7/1997 | Krivokapic et al. .................... 716/8 |
| 6,088,658 | * | 7/2000 | Yazici et al. ........................... 702/58 |

* cited by examiner

*Primary Examiner*—William Grant
*Assistant Examiner*—Kidest Bahta

(57) ABSTRACT

Method for adequately modeling process induced variabilities is disclosed that comprises the steps of acquiring experimental data and defining a particular design space. Values for the mean and standard deviation of the experimental data at each of the points defining the design space are calculated. The experimental values of the output parameters at each of the design points is normalized to extract the shape of the distribution of each of the design points. The normalized values are then merged to form a cumulative distribution function associated with the data. The cumulative distribution function is applied to a new design point in a predicted fashion by first calculating a mean and standard deviation value for the new point by interpolating from the mean and standard deviation values from the experimental data. The cumulative distribution function is then scaled and centered using the interpolated mean and standard deviation values to provide a predicted data distribution for the new design point.

7 Claims, 1 Drawing Sheet

SYSTEM AND METHOD FOR NON-PARAMETRIC MODELING OF PROCESSED INDUCED VARIABILITY

This application claims priority under 35 USC §119(e)(1) of provisional application No. 60/070,551 filed Jan. 6, 1998.

TECHNICAL FIELD OF THE INVENTION

This invention relates in general to the field of electronic devices, and more particularly, to an improved system and method for non-parametric modeling of processed-induced variability.

BACKGROUND OF THE INVENTION

The trend towards small feature sizes in solid state integrated circuits has increased the need to accurately characterize the distribution of process and device responses to predict and improve design for manufacturability. The usual approach to characterization assumes that the response distributions have a parametric form or normal distribution. For example, in the designed experiment with a limited number of design points, it is possible to build response surface models (RSM) for the mean and variance as a function of process settings. This model is then used to predict the mean and variance at an arbitrary point in the design space. This information, and the assumption of normality, compactly characterizes the predicted response distribution at the interpolated point in the design space.

One problem with the traditional approach is that the response data may not have a normal or a closed form distribution. This may be due to the inherent features of the measured data or due to spatial dependencies of measurements with a particular experimental structure such as a semiconductor wafer. For example, in experiments measuring the salicidation process which involves the formation of silicide region using a self-aligned process, the design characteristics of contact resistance and sheet resistance were found to be functions of specific process settings such as implant dose, titanium thickness, anneal temperature, and anneal time. However, the experimental data measuring the contact resistance and sheet resistance did not follow any standard parametric distribution. As a result, estimation of process variability at an interpolated point within the design space is extremely difficult.

SUMMARY OF THE INVENTION

Accordingly, a need has arisen for a process modeling system and method that addresses the non-parametric data distributions associated with current process technologies.

In accordance with the teachings of the present invention, a modeling system and method are provided that substantially eliminate and reduce problems associated with prior systems and techniques. According to one embodiment of the present invention, a modeling method is disclosed that provides a non-parametric approach to address the problems with conventional systems. According to the teachings of the present invention, the experimental data is first used to build response surface models for the mean and variance of the experimental data at various points within the design space. Next, an empirical cumulative distribution function (CDF) is generated that represents the overall shape of the data by accumulating the shape evidence from each of the available design points. The umulative distribution function and the response surface models for the mean and variance allows the experimental data to be interpolated over the entire design space and allows the process induced variability to be compactly represented using the cumulative distribution function.

BRIEF DESCRIPTION OF THE DRAWINGS

A more complete understanding of the advantages of the present invention may be acquired by referring to the accompanying figures in which like reference numbers indicate like features and wherein.

DETAILED DESCRIPTION OF THE INVENTION

In order to explain the technical advantage of the techniques of the present invention a description associated with a particular example is helpful. One form of semiconductor processing involves the creation of a layer of titanium silicide adjacent various conductive regions within an integrated circuit. Titanium silicide reduces the contact resistance when metal contacts are later made to these regions. If this process is performed in a self-aligned manner the entire process is often referred to as salicidation. The process involves the implantation of ions into the region on which the silicide is to be formed. A layer of titanium is then deposited on that region and the structure is annealed. The critical characteristic of the resulting structure is the contact resistance. As such, the salicidation process can be characterized with three input variables that can be adjusted to alter a single critical output variable. The three input variables are the implant dose, the titanium thickness and the anneal temperature. The output variable is the contact resistance.

Figure 1:
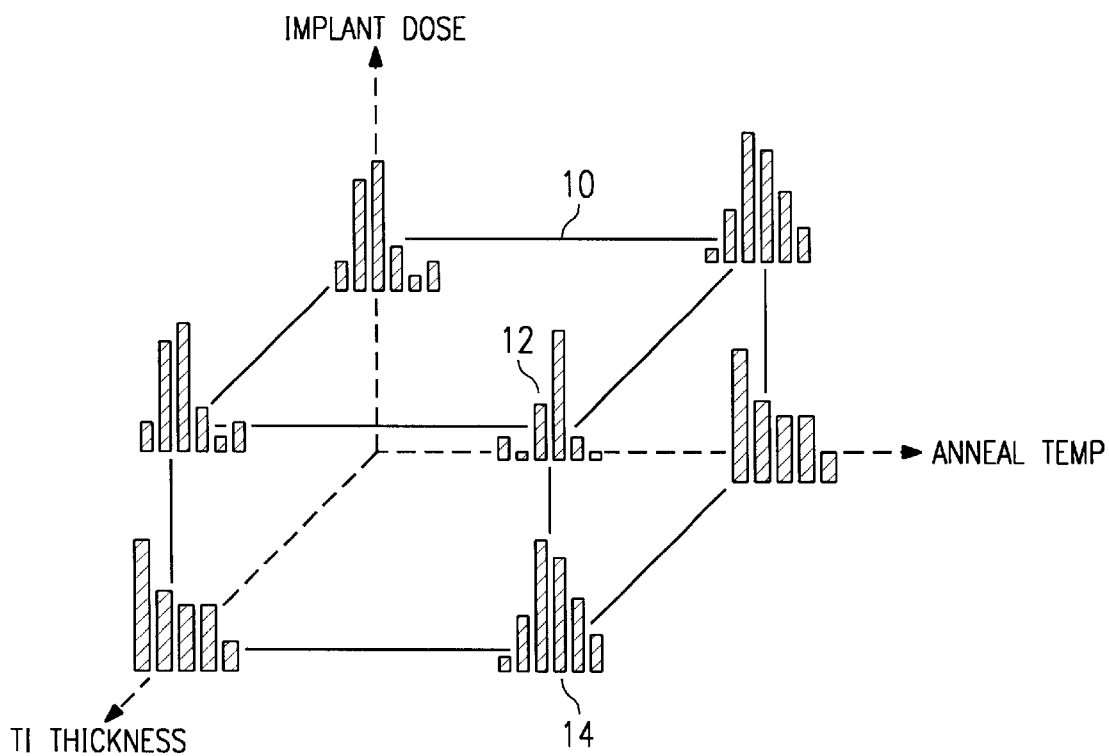
FIG. 1 is a graphical illustration of the design space used according to the teachings of the present invention.

The alteration of these input variables independently of one another creates a design space which is illustrated in FIG. 1. FIG. 1 is a graphical illustration which shows three perpendicular axes. The axes separately illustrate the titanium thickness, anneal temperature and implant dose variables discussed previously. The three dimensional rectangular block 10 illustrated in FIG. 1 defines the boundary of this design space. The edges of block 10 represent the maximum or minimum values of the various input variables. Accordingly, the intersection of the three axes is not typically a zero value for any of the variables. The intersection will be the intersection of the minimum values that were typically used for these processes.

The first step of the modeling technique of the present invention involves the acquisition of experimental data to characterize the distribution of the values for the output variables as the input variables are changed. In FIG. 1 these experimentally determined distributions are illustrated as bar diagrams such as bar diagram 12. Diagram 12 characterizes experimentally determined values for the contact resistance when each of the titanium thickness, implant dose and anneal temperature are given their maximum values. Similarly, bar diagram 14 shown in FIG. 1 is a characterization of experimentally determined data for the contract resistances when the titanium thickness and anneal temperature are given their maximum value but the implant dose is given its minimum value.

The data that is characterized by diagrams 12 and 14 involve many test points from an experimental lot of test wafers. For example, the experiments may involve testing the contact resistance following the salicidation process at 24 die locations on 24 different wafers. In this manner, the placement of a particular die on a wafer as well as processes that might change over time as different wafers are processed will all be included within the experimental results.

It is important to note that the experimental data of these large number of test points does not typically lend itself to a parametric distribution form. For example, diagrams 12 and 14 are very different in shape and it would be difficult to find a single normal distribution function that would accurately characterize both shapes. Prior techniques have attempted to utilize the experimental data to select a particular parametric model. For example, prior methods would attempt to fix a suitably shaped Gaussian curve to an experimentally determined distribution. However, experimental results have shown that this is highly inaccurate.

According to the teachings of the present invention, experimental data is acquired for an adequate number of points to accurately define the design space. For example, experimental data can be acquired for the corners or boundaries of the design space. In the example shown in FIG. 1, this would be the eight corners of the rectangular block 10. In addition, experimental data could be acquired for the center portions of the faces of block 10 and for the geometric center of the block 10. The more experimental data acquired the more accurate the modeling technique will be. However, as will be discussed more completely herein, the application of the techniques of the present invention to even a small experimental data set dramatically improves the accuracy relative to normal parametric modeling.

Once the experimental data has been acquired to define adequately the design space, the mean and standard deviation are calculated for each of the experimental points within the design space. Models suitable for interpolation, such as response surface models, are built from this experimental data. Next, the experimental data is normalized so that all the experimental data sets at all the data points have a constant mean and standard variance. The normalization process is important in order that only the shape of the distributions as opposed to their gross values will affect the cumulative distribution function.

Figure 2:
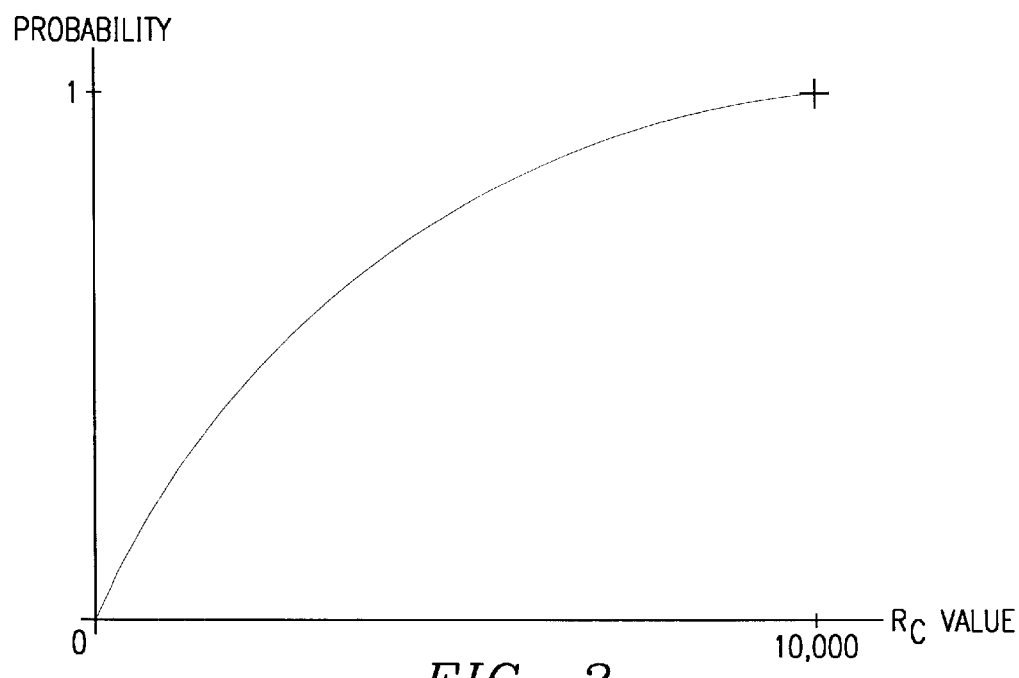
FIG. 2 is a graphical illustration of one representation of a cumulative distribution function used in the method of the present invention.

After the data has been normalized, the normalized data is merged with equal weight given to all data sets resulting in an empirical cumulative distribution function. This function represents the overall shape of the data by cumulating the shape evidence from each of the available data points. The cumulative distribution function need not have any normal parametric form. It is an experimentally determined representation of the shape of the entire data set. However, if, by chance, the data set actually does follow a normal parametric form the cumulative distribution function will represent that form accurately. For example, if a particular process resulted by chance in a clean Gaussian distribution, the cumulative distribution function would appear to be that of a Gaussian distribution. In other words, the normal parametric forms used in the past will present themselves in the same manner as any non-parametric shape. In the specific example described herein, the cumulative distribution function of the contact resistance can be stored as a look-up table of cumulative probabilities. FIG. 2 is a graphical illustration of the cumulative probability curve of the value of the contact resistance. This is a useful format for the data for a variable such as the contact resistance because a designer will typically want to know what the probability is that the contact resistance will be within a particular range. This can be calculated by subtracting the two probability values associated with the two endpoints of the desired range.

The cumulative distribution function is applied by a designer attempting to predict the efficacy of a particular set of input variables for a process. This is accomplished by taking the cumulative distribution function and centering and scaling the distribution to the appropriate mean and standard deviation values for the desired point within the design space. As discussed previously, the mean value and standard deviation models allow the estimation of the mean and standard deviation at any interior point of interest within the design space. The process designer can then select a point within the design space that he wishes to examine. The appropriate value for the mean and standard deviation for this selected value can then be interpolated from the mean and standard deviation values of the experimental points using linear or higher order interpolation techniques such as quadratic interpolation. The interpolated mean value and interpolated standard deviation value are then used to center and scale the cumulative distribution function. The adjusted distribution function can then be used with a high degree of accuracy to predict the output variable characteristics and distribution when the input variables are given the values selected by the designer.

Experimental data illustrates that the technique of the present invention is much more accurate than attempts to use normal parametric approximations. According to one experiment, 24 die locations on 24 wafers were tested in a salicidation process. The observed data resulted in a mean value for the contact resistance of 46 $\Omega$-$\mu$m and standard deviation of 23 $\Omega$-$\mu$m. The experimental data showed that the contact resistance was less than 50 $\Omega$-$\mu$m for roughly 47% of the dies. A normal approximation predicted that this value would have been approximately 40%. This significantly understates the actual number of dies that have the required value with an error of 17%. Using the method of the present invention the predicted percentage is 46%. Using the method of the present invention, the error is only 4%. Accordingly, the method of the present invention in the experimental case gave a significantly more accurate prediction because it provides a significantly more accurate representation of the data distribution.

The technique of the present invention enjoys several important technical advantages. First the technique can compactly represent arbitrarily shaped distributions which may include a variety of environmental process variations. As semiconductor wafer sizes increase, spatial dependencies of data sets within a wafer are increasingly more prevalent. These dependencies do not lend themselves well to normal parametric distributions. As such, the technique of the present invention will provide much more accurate representations of these dependencies. As discussed previously, if a particular experimental data set happens by chance to follow a parametric distribution, the technique of the present invention will not provide less accurate information but will provide identical information that would have been provided had the parametric approach been taken in the first place. Finally, the complete predicted distribution for any point within a design space can be characterized in an extremely compact manner by three quantities comprising the empirical cumulative distribution function, the mean estimate and the variance estimate. This compact representation facilitates rapid yield prediction within the design space and thereby aids in the design of the systems for manufacture ability.

Although the present invention has been described in detail it should be understood that various changes, substitutions and alterations may be made to the teachings herein without departing from the spirit and scope of the present invention which is solely defined by the appended claims.

What is claimed is:

1. A method for predictive modeling of a process comprising the steps of:

accumulating experimental data associated with a relationship of a particular output parameter and a variance in that output parameter as a plurality of input parameters are varied, the experimental data accumulated at a plurality of data points defining a design space;

calculating a mean and standard deviation of the experimental data accumulated for each of the data points;

normalizing the experimental data at each of the data points to a common mean and variance;

merging the normalized data to create a cumulative distribution function representing an overall shape of the accumulated data;

calculating an interpolated mean value and standard deviation value for a new point within the design space using the mean and standard deviation calculated for the data points; and applying the interpolated mean value and interpolated standard deviation value to the cumulative distribution function to provide a predicted output data distribution for the new point.

2. The method of claim 1 wherein the process associated with modeling comprises silicidation of an integrated circuit contact and the input parameters comprise a titanium thickness associated with the process, an anneal temperature associated with the process and an implant dose associated with the process and the output parameter comprises a contact resistance of silicide material formed.

3. The method of claim 1 further comprising the step of storing the cumulative distribution function as a look up table of cumulative probability such that the predicted output comprises a probability value that the output parameter will be within a particular range of values.

4. The method of claim 1 wherein the step of accumulating experimental data comprises the step of acquiring experimental data at data points defining the design space that comprise maximum and minimum values of each of the input parameters.

5. The method of claim 4 wherein the step of accumulating experimental data further comprises the step of acquiring experimental data at a point within the design space that corresponds to an average value for each of the input parameters so as to define a point in the center of the design space.

6. The method of claim 1 wherein the step of calculating an interpolated mean value and an interpolated standard deviation value comprises the step of calculating interpolated values using linear interpolation.

7. The method of claim 1 wherein the step of calculating an interpolated mean value and an interpolated standard deviation value comprises the step of calculating interpolated values using quadratic interpolation.

* * * * *